United States Patent [19]
Porter et al.

[11] Patent Number: 5,826,051
[45] Date of Patent: Oct. 20, 1998

[54] METHOD AND APPARATUS FOR SIMPLIFYING ACTIVE WINDOW SELECTION, APPLICATION ACTIVATION, AND SHARED COMMAND EXECUTION IN A MULTI-APPLICATION ENVIRONMENT

[75] Inventors: Daniel R. Porter, Portland; Dale W. Boss, Beaverton; David L. Anderson, Portland; Anthony C. Salvador, Hillsboro; Rune A. Skarbo, Portland, all of Oreg.

[73] Assignee: Intel Corporation, Santa Clara, Calif.

[21] Appl. No.: 578,988

[22] Filed: Dec. 27, 1995

[51] Int. Cl.[6] ........................................ G06F 3/00
[52] U.S. Cl. .................... 395/345; 395/352; 395/329
[58] Field of Search .................... 395/340, 343, 395/345, 329, 330, 331, 352

[56] References Cited

U.S. PATENT DOCUMENTS 4,713,656  12/1987  Cliff et al. ........................ 395/345 X
5,565,910  10/1996  Rowse et al. ............................ 348/15

OTHER PUBLICATIONS

"PictureTel introduces new Windows 95—based desktop develop videoconferencing product: New standards–based PCS 200 jointly with Compaq", PictureTel Corporation News Release, 16 Oct. 1995, pp. 1–4.

*Primary Examiner*—Raymond J. Bayerl
*Assistant Examiner*—A. Katbab
*Attorney, Agent, or Firm*—Blakely, Sokoloff, Taylor & Zafman

[57] ABSTRACT

A method and apparatus for simplifying active window selection and shared command execution in a computer system generates a menu corresponding to a first application of a plurality of applications which can be executed concurrently in the computer system. The menu identifies a subset of the plurality of applications whose corresponding windows can be made currently active. Additionally, one or more of the subset of applications is installed but is not executing at the computer system. A selection identifying one of the subset of applications is then received, and a window corresponding to the identified one of the subset of applications is made the currently active window. In one embodiment, the menu also includes a set of shared commands which can be executed in the computer system. These shared commands perform the same function for each application of the subset of applications. In this embodiment, upon selection of one of the shared commands from the menu, the selected command is executed.

20 Claims, 5 Drawing Sheets

METHOD AND APPARATUS FOR SIMPLIFYING ACTIVE WINDOW SELECTION, APPLICATION ACTIVATION, AND SHARED COMMAND EXECUTION IN A MULTI-APPLICATION ENVIRONMENT

BACKGROUND OF THE INVENTION

1. Field of the Invention

The present invention pertains to the field of multi-application environments. More particularly, this invention relates to selecting active windows, activating applications, and executing shared commands in a multi-application data and/or video conference.

2. Background

Computer technology is continuously advancing, resulting in modern computer systems which provide ever-increasing performance. One result of this improved performance is an increased use of computer systems by individuals in a wide variety of business, academic and personal applications. One such use is that of data and/or video conferencing, where individuals in different locations can communicate with each other via their computer systems. Typically, data conferencing refers to individuals viewing documents, data, or similar information, and video conferencing refers to individuals viewing images (generally of one another). The different locations can span virtually any distance, such as between multiple offices in the same building or between multiple offices in different countries.

The benefits of data and/or video conferencing are numerous. Among these benefits is the ability of multiple individuals to effectively and quickly communicate information and ideas to one another over large distances. The information and ideas can be displayed by each computer system, and frequently verbal discussions can accompany the images. Data and video can both be transmitted in a conferencing environment.

In a data and/or video conference, conference participants frequently need access to multiple applications and windows quickly. For example, a video window(s) displaying one or more additional conference participants as well as a video window(s) displaying one or more documents may be displayed at each conferencing end point.

One problem which exists in many current multi-application environments, including conferencing environments, is an inability to easily access other application windows which are currently executing. For example, a particular conference participant's display may not be able to display all of the windows simultaneously—some windows may overlay other windows. Thus, it would be beneficial to provide a mechanism which allows conference participants to easily and quickly access multiple application windows during a data and/or video conference.

Additionally, conference participants may need to execute an additional application(s) during a conference. For example, the conference participants may decide to share a new application which was not being shared when the conference began. Thus, it would be beneficial to provide a mechanism which allows conference participants to easily and quickly access additional applications during a data and/or video conference.

Furthermore, many conference participants typically have several installed applications which can be executed at their end point. These applications include both conferencing applications and non-conferencing applications. Conferencing applications refer to those applications which can be executed and shared with other conference participants as part of a data and/or video conference. Non-conferencing applications, however, cannot be shared in a conference. Given these different types of applications which many conference participants have access to on their respective end points, it would be beneficial to provide a mechanism which allows conference participants to easily identify which applications can be shared as part of the conference and which applications cannot be shared.

In addition, many applications within a particular environment may use the same commands. For example, each of multiple conferencing applications may provide the conference participants with the ability to call another conference end point or disconnect from the conference. Individual applications typically have their own individualized interfaces, resulting in different applications having different steps which must be followed to perform these same functions. Having to work through multiple different interfaces can be both time consuming and frustrating to individual users. Thus, it would be beneficial to provide a mechanism which simplifies the execution of shared commands.

As will be described in more detail below, the present invention provides for a method and apparatus that achieves these and other desired results which will be apparent to those skilled in the art from the description to follow.

SUMMARY OF THE INVENTION

A method and apparatus for simplifying active window selection and shared command execution in a computer system, wherein a plurality of applications can be executed concurrently in the computer system, is described herein. A menu corresponding to a first application of the plurality of applications is generated, wherein the menu identifies a subset of the plurality of applications whose corresponding windows can be made currently active. Additionally, one or more of the subset of applications is installed but is not executing at the computer system. A selection identifying one of the subset of applications is then received, and a window corresponding to the identified one of the subset of applications is made the currently active window.

In one embodiment, the menu also includes a set of shared commands which can be executed in the computer system. These shared commands perform the same function for each application of the subset of applications. Upon selection of one of the shared commands from the menu, the selected command is executed.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

The present invention provides a method and apparatus for simplifying active window selection, application activation, and shared command execution in a multi-application environment. Applications can register with the present invention when, for example, they are installed at a conferencing end point. A user at that end point is then able to select registered applications, such as from a drop-down menu. Once a particular application is selected by the user, the present invention makes the window(s) for that application the current active window. In addition, the application is launched if it is not already executing at the end point, making the selected application window(s) the current window(s). Furthermore, shared commands which are available from all of the applications in the environment can be provided by the present invention, thereby providing a consistent mechanism for users to activate the commands, regardless of which application the request is made from. Thus, the present invention provides a quick and easy mechanism to allow different application windows to be selected and made active and to allow shared commands to be executed by a user.

Figure 1:
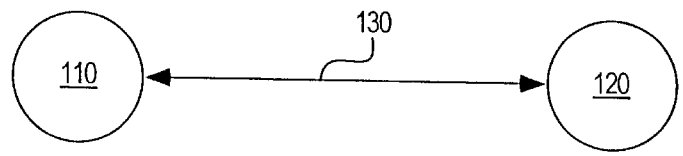
FIG. 1 shows a conferencing environment according to one embodiment of the present invention.

FIG. 1 shows a conferencing environment according to one embodiment of the present invention. Conferencing environment 100 includes two end points 110 and 120 coupled together by a communication link 130. In one implementation, each of the end points 110 and 120 are general personal computer systems. Alternatively, end points 110 and 120 could be dedicated conferencing systems.

Communication link 130 represents any of a wide variety of conventional communication media. For example, communication link 130 can be an Integrated Services Digital Network (ISDN) or Plain Old Telephone Service (POTS) line, Ethernet cable, a fiber optic line, portions of the Internet, etc. Additionally, communication link 130 can be a wireless communication medium, such as signals propagating in the infrared or radio frequencies. Furthermore, communication link 130 can be a combination of communication media and can include converting devices for changing the form of the signal based on the communication media being used.

Figure 2:
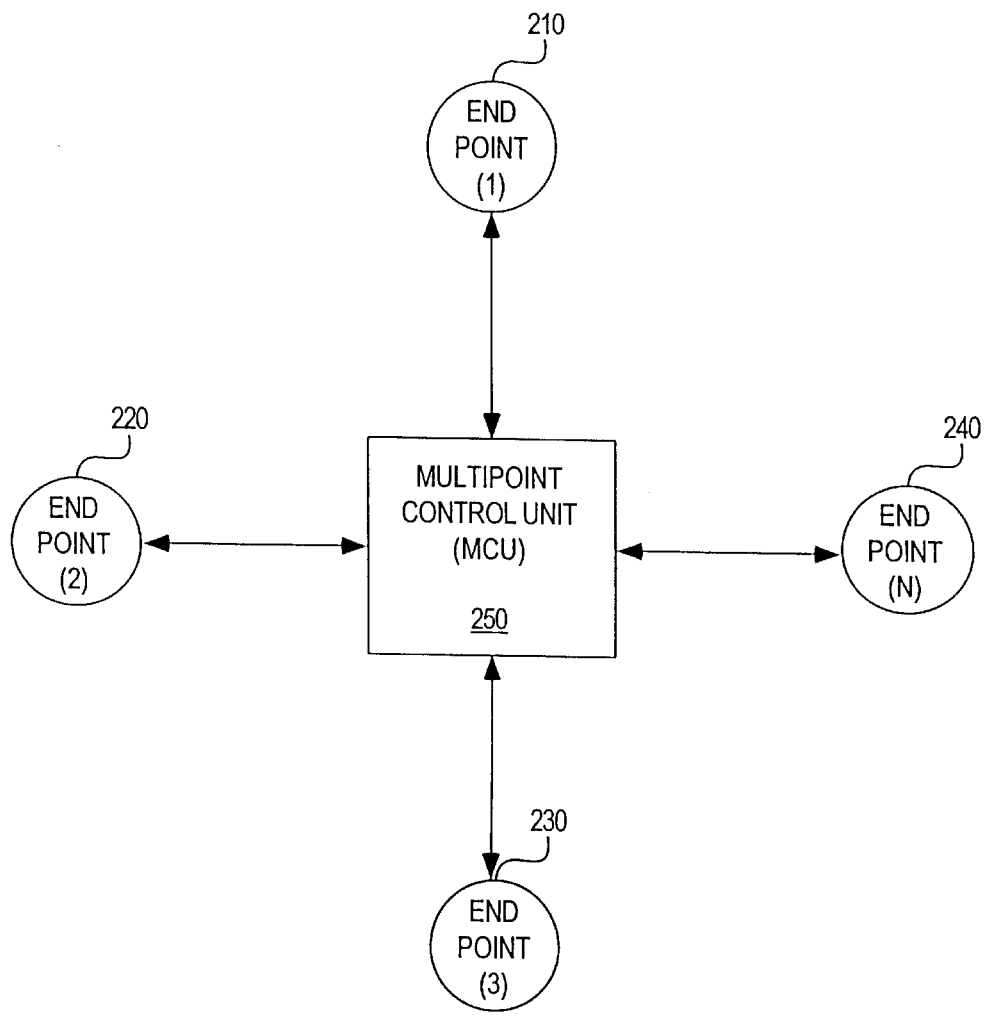
FIG. 2 shows a conferencing environment according to another embodiment of the present invention.

FIG. 2 shows a conferencing environment according to another embodiment of the present invention. Conferencing environment 200 includes multiple (N) end points: end point 210, end point 220, end point 230, and end point 240. Each of the end points 210–240 are coupled together via a multipoint control unit (MCU) 250. MCU 250 is a switching device which transfers inputs received from each end point to the other end points. MCU 250 is coupled to each end point via a communication link, as shown in FIG. 2. Each communication link can be any of a wide variety of conventional communication media, analogous to communication link 130 of FIG. 1 discussed above.

Each end point 210–240, as well as end points 110 and 120 of FIG. 1, is coupled to a video camera. The video cameras provide a visual representation of the user of the end point, thereby allowing each conference participant to see the other participants, even though they may be separated by great distances. In one embodiment, these video cameras are ProShare™ video cameras, available from Intel Corporation of Santa Clara, Calif.

In one embodiment of the present invention, MCU 250 is a dedicated switching device. Alternatively, MCU 250 can be implemented in software, such as on a computer system coupled to a local area network (LAN). It is to be appreciated that any of a wide variety of conventional multipoint control units can be used with the present invention.

It should be noted that in some embodiments of the present invention MCU 250 is not necessary in multipoint conferences. In these embodiments, each end point receives all of the conferencing information and performs the switching function of MCU 250.

Applications can be shared between multiple systems in the conferencing environment by having the application execute on only a single system. This is typically referred to as "application sharing". The system which executes the application is referred to as the host system. The host system transfers the necessary information from the host system to one or more end points to allow the end point(s) to display the application and appear to the users of the end point(s) as if the application were actually executing at their end point(s).

Additionally, applications can also be shared between multiple systems in the conferencing environment where the application is executing at all of the end points. When an application is executing at multiple end points, each participant can make changes to the application data at his or her end point (subject to any turn-taking controls which may be in place). The end point then sends a message to all of the other end points indicating the changes which were made by the participant. The other end points receive these messages and provide the changes as inputs to the application they are executing.

The conferencing environments which can be used with the present invention support both data conferences and audio/video conferences. A data conference is a conference where one or more documents or similar information are displayed to each participant (e.g., application sharing or the ProShare™ notebook). An audio/video conference is a conference where one or more visual images (e.g., images of conference participants) are displayed to each participant along with audio signals from the participants. The present invention also supports data and audio/video conferences concurrently, such as by displaying a conference participant, a document(s), and providing the participant's voice simultaneously. The conference data of a conference refers to the data or information being provided to the conference participants, such as a shared application information, video images or audio signals.

Figure 3:
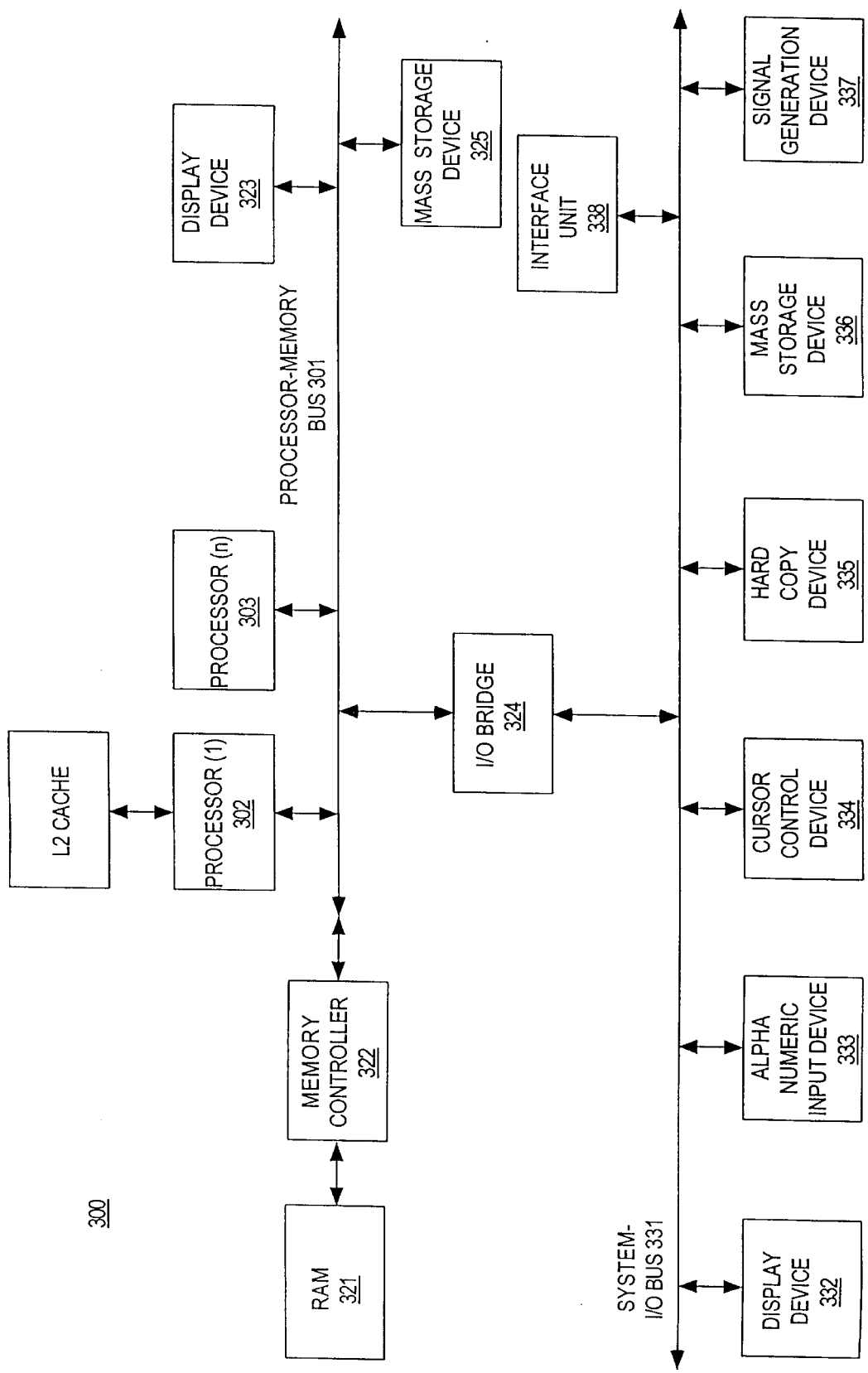
FIG. 3 shows an overview of a computer system which can be used in a conferencing environment according to one embodiment of the present invention.

FIG. 3 shows an overview of a computer system which can be used in a conferencing environment according to one embodiment of the present invention. In one embodiment, end points 110 and 120 of FIG. 1 are each a computer system 300 of FIG. 3. In another embodiment, each of the end points coupled to MCU 250 of FIG. 2 is a computer system 300 of FIG. 3.

The computer system 300 generally comprises a processor-memory bus or other communication means 301 for communicating information between one or more processors 302 and 303. Processor-memory bus 301 includes address, data and control buses and is coupled to multiple devices or agents. Processors 302 and 303 may include a small, extremely fast internal cache memory (not shown), commonly referred to as a level one (L1) cache memory for temporarily storing data and instructions on-chip. In addition, a bigger, slower level two (L2) cache memory 304 can be coupled to processor 302 or processor 303 for temporarily storing data and instructions for use by the processor. In one embodiment, processors 302 and 303 are Intel® Architecture compatible microprocessors, such as i386™, i486™, Pentium™ or Pentium Pro™ processors. However, the present invention may utilize any type of microprocessor, including different types of processors.

Also coupled to processor-memory bus 301 is processor 303 for processing information in conjunction with processor 302. Processor 303 may comprise a parallel processor, such as a processor similar to or the same as processor 302. Alternatively, processor 303 may comprise a co-processor, such as a digital signal processor. The processor-memory bus 301 provides system access to the memory and input/output (I/O) subsystems. A memory controller 322 is coupled with processor-memory bus 301 for controlling access to a random access memory (RAM) or other dynamic storage device 321 (commonly referred to as a main memory) for storing information and instructions for processor 302 and processor 303. A mass data storage device 325, such as a magnetic disk and disk drive, for storing information and instructions, and a display device 323, such as a cathode ray tube (CRT), liquid crystal display (LCD), etc., for displaying information to the computer user are coupled to processor-memory bus 301.

An input/output (I/O) bridge 324 is coupled to processor-memory bus 301 and system I/O bus 331 to provide a communication path or gateway for devices on either processor-memory bus 301 or I/O bus 331 to access or transfer data between devices on the other bus. Essentially, bridge 324 is an interface between the system I/O bus 331 and the processor-memory bus 301.

System I/O bus 331 communicates information between peripheral devices in the computer system. In one embodiment, system I/O bus 331 is a Peripheral Component Interconnect (PCI) bus. Devices that may be coupled to system I/O bus 331 include a display device 332, such as a cathode ray tube, liquid crystal display, etc., an alphanumeric input device 333 including alphanumeric and other keys, etc., for communicating information and command selections to other devices in the computer system (for example, processor 302) and a cursor control device 334 for controlling cursor or pointer movement. moreover, a hard copy device 335, such as a plotter or printer, for providing a visual representation of the computer images and a mass storage device 336, such as a magnetic disk and disk drive, for storing information and instructions, and a signal generation device 337 may also be coupled to system I/O bus 331.

In one embodiment of the present invention, signal generation device 337 includes, as an input device, a standard microphone to input audio or voice data to be processed by the computer system. The signal generation device 337 also includes an analog to digital converter to transform analog audio data to digital form which can be processed by the computer system. The signal generation device 337 also includes, as an output, a standard speaker for realizing the output audio from input signals from the computer system. Signal generation device 337 also includes well known audio processing hardware to transform digital audio data to audio signals for output to the speaker, thus creating an audible output.

In one embodiment of the present invention, signal generation device 337 also includes, as an input device, a ProShare™ video camera to input video images to be processed by the computer system. The video camera is coupled to an analog to digital converter to transfer analog video data to digital form which can be processed by the computer system.

An interface unit 338 is also coupled with system I/O bus 331. Interface unit 338 allows system 300 to communicate with other computer systems by sending and receiving the video, audio and data signals for the conference, as well as the necessary control signals based on the communication medium being used. In one embodiment, interface 338 is a conventional ISDN adapter which provides communication between the system 300 and an ISDN line. Alternatively, interface unit 338 could be a modem, a conventional network adapter such as an Ethernet LAN adapter, or any of a wide variety of other communication devices.

The display device 332 used with the computer system and the present invention may be a liquid crystal device, cathode ray tube, or other display device suitable for creating graphic images and alphanumeric characters (and ideographic character sets) recognizable to the user. The cursor control device 334 allows the computer user to dynamically signal the two dimensional movement of a visible symbol (pointer) on a display screen of the display device 332. Many implementations of the cursor control device are known in the art including a trackball, trackpad, mouse, joystick or special keys on the alphanumeric input device 333 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled.

In one embodiment of the present invention, system 300 executes the Microsoft Windows™ operating system. It is to be appreciated, however, that system 300 represents any of a wide variety of conventional computer systems that can execute any of a wide variety of operating systems.

Certain implementations of the present invention may include additional processors or other components. Additionally, certain implementations of the present invention may not require nor include all of the above components. For example, display device 323 or mass storage device 325 may not be coupled to processor-memory bus 301, or system 300 may contain only a single processor (e.g., only processor 302). Furthermore, the peripheral devices shown coupled to system I/O bus 331 may be coupled to processor-memory bus 301; in addition in some implementations only a single bus may exist with the processors 302 and 303, memory controller 322, and peripheral devices 332 through 339 coupled to the single bus.

Figure 4:
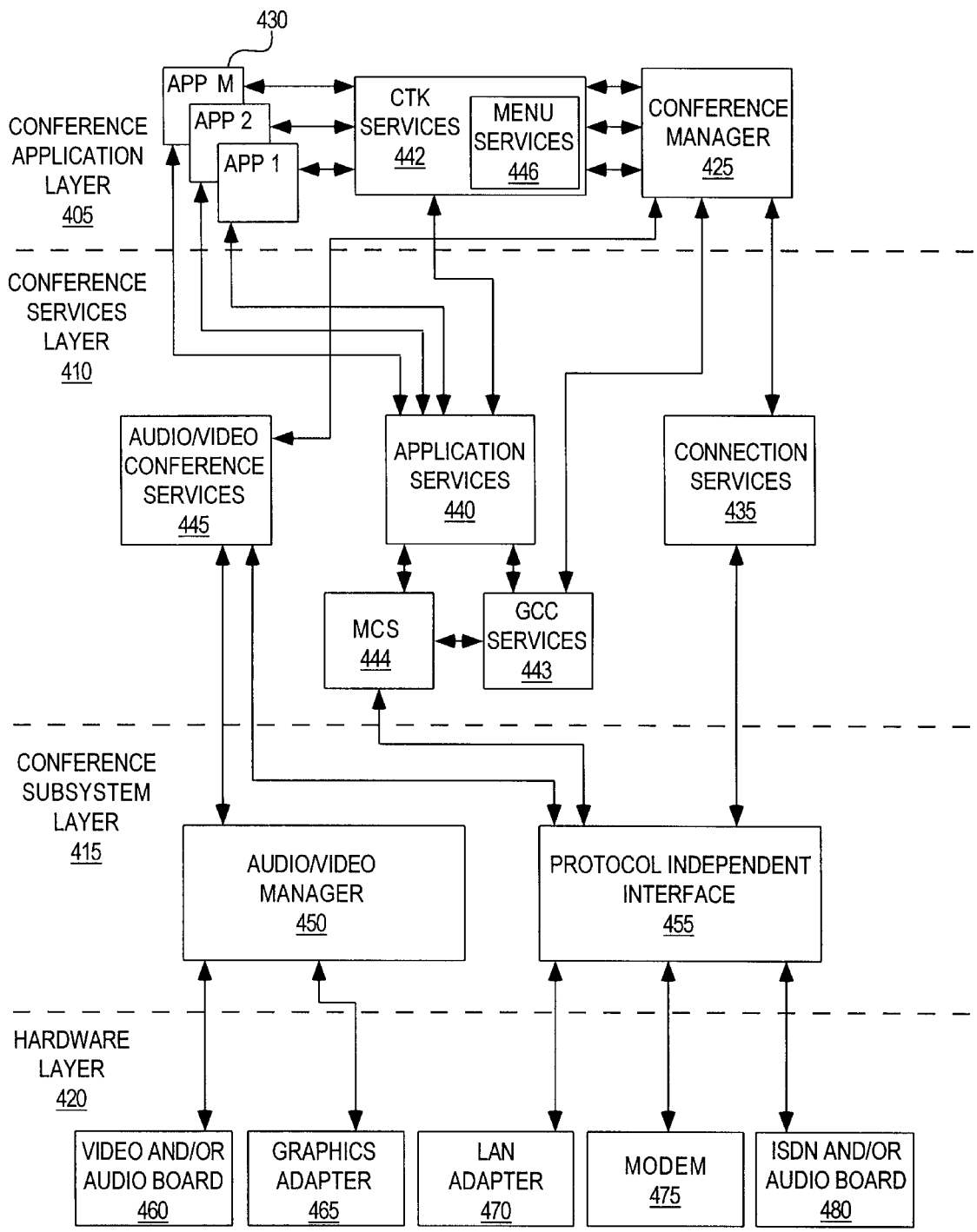
FIG. 4 is a block diagram showing an architectural overview of conferencing on an end point according to one embodiment of the present invention.

FIG. 4 is a block diagram showing an architectural overview of conferencing on an end point according to one embodiment of the present invention. As shown in FIG. 4, the conferencing architecture is separated into multiple layers. These layers are conference application layer 405, conference service layer 410, conference subsystem layer 415, and hardware layer 420.

Conference application layer 405 includes conference manager 425, multiple applications 430, and connection toolkit (CTK) services 442. Conference manager 425 provides a conferencing interface to the user of the end point. In one embodiment, the conferencing interface is a graphical user interface (GUI). In one implementation, conference manager 425 includes options, such as through a menu, which allows the end point user to add or delete applications to the conference.

Applications 430 represent any of a wide variety of conventional software applications. In one embodiment of the present invention, one of the applications 430 is a notebook application which is provided by the ProShare™ conferencing system. The notebook application allows the end point users to input text and/or drawings for the conference. In one implementation, additional applications are, for example, application sharing software, a high-quality image sharing application(s), or a file transfer application(s). It is to be appreciated that any number of applications can be executed at an end point.

CTK services 442 provides an interface which allows messages to be transferred between applications 430 and conference manager 425. In one embodiment of the present invention, CTK services 442 calls functions provided by the operating system of the end point to execute selected applications which have been identified by menu services 446. In this embodiment, menu services 446 provides the necessary information to execute the application, such as the location of the executable file within the endpoint, initial preferences, etc.

Menu services 446 provides support for the simplifying of active window selection, application activation, and shared command execution according to the present invention. In one embodiment, menu services 446 is a library of function calls which are available to the applications executing at an end point, as discussed in more detail below.

Conference application layer 405 is coupled to conference service layer 410. Conference service layer 410 includes connection services 435, application services 440, generic conference control (GCC) services 443, multipoint communication services (MCS) 444, audio/video conference services 445, and menu services 446. Connection services 435 establishes and maintains connections with the other end point(s), via the MCU if necessary. Connection services 435 interfaces between the conference subsystem layer 415 and conference manager 425 when establishing connections which are initiated by either this end point or another end point. In one embodiment, connection services 435 also includes address book services which provide services related to managing connection addresses for conference participants.

Application services 440 provides an interface between applications 430 and conference subsystem layer 415. Application services 440 also provides an interface between applications 430, and GCC services 443 and MCS 444. In one implementation, application services 440 also prevents one application from unfairly dominating the communication services of lower layers.

GCC services 443 maintains a record of the applications 430 which are executing on the end point and provides registry services to allow applications 430 to register with GCC services 443. In addition, GCC services 443 also maintains a record of current conference participants.

MCS 444 provides support for full-duplex multipoint communication among an arbitrary number of connected application entities over a variety of conventional networks. In one implementation, MCS 444 provides multipoint message routing and message broadcasting. The multipoint message routing ensures that the other end points all receive messages from this system in the same order, and identifies the shortest path to each of the other end points.

Message broadcasting allows connection information to be broadcast to all end points in the conference.

Audio/Video conferencing services 445 provides an interface between conference subsystem layer 415 and conference manager 425. Audio/Video services 445 provide audio and video services to conference application layer 405, such as capture and playback services for video streams.

Conference subsystem layer 415 operates in a conventional manner to provide an interface between the protocol-independent conference service layer 410 and the specific protocols of the devices in hardware layer 420. Audio/video manager 450 provides an interface which receives audio and video data from audio/video conference services 445 and outputs it to the hardware layer 420 for display or audio play.

Protocol independent interface 455 provides an interface between the components of conference service layer 410 and hardware layer 420. Interface 455 receives data and messages from the components of conference service layer 410 and converts the information received to the proper format based on the hardware connected to the system.

Hardware layer 420 includes video and/or audio board 460 and graphics adapter 465. The board 460 and adapter 465 are conventional computer system boards for realizing video and/or audio outputs. For example, the video outputs may be realized on a display device and the audio outputs may be realized via a computer system speaker. The board 460 and adapter 465 also provide sampling, digitization, compression/decompression of audio signals exchanged between two end points over a full-duplex audio connection, as well as interfacing with the proper CODEC to compress and decompress the video signals.

Hardware layer 420 also includes a LAN adapter 470, modem 475, and ISDN and/or audio board 480. LAN adapter 470 is a conventional LAN adapter, such as an Ethernet adapter. Modem 475 is a conventional line for coupling the end point to a POTS line. ISDN and/or audio board 480 is a conventional ISDN line which can also include audio support.

It is to be appreciated that, depending on the conferencing environment, all of the components of hardware layer 420 may not be included. For example, LAN adapter 470 may not be included in one of the end points.

Figure 5:
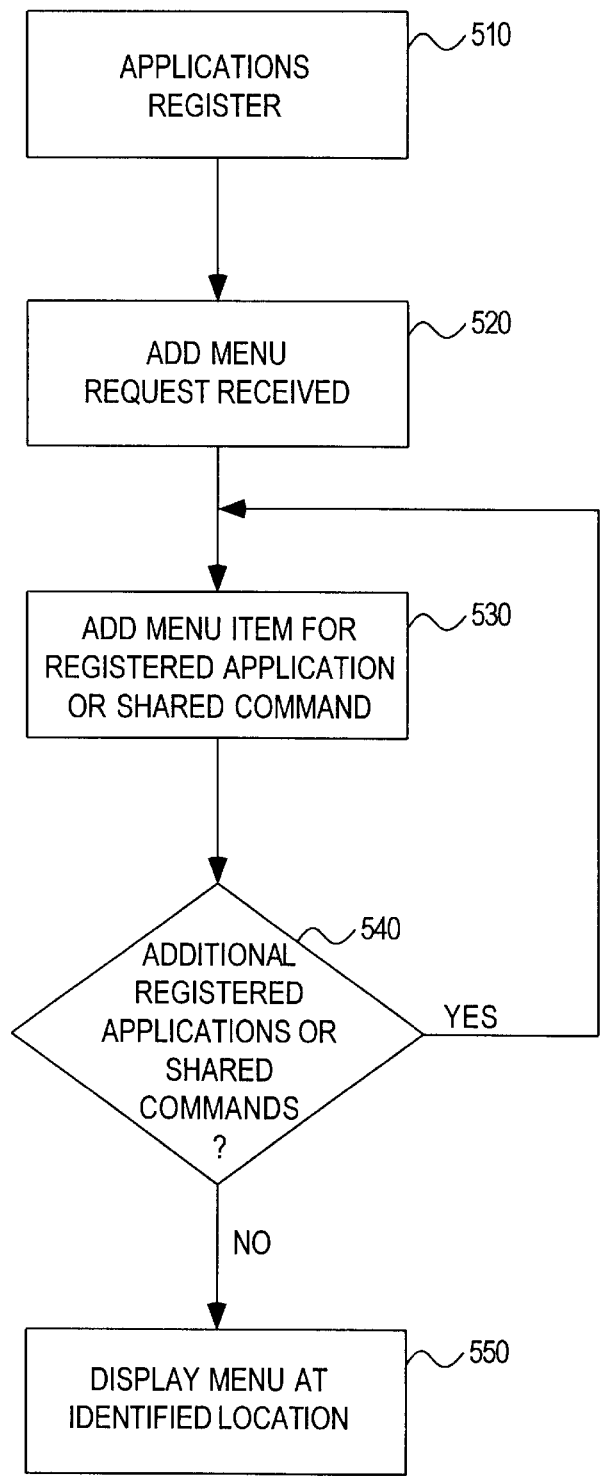
FIG. 5 shows the steps followed in generating a menu of applications and shared commands according to one embodiment of the present invention.

FIG. 5 shows the steps followed in generating a menu of applications and shared commands according to one embodiment of the present invention. Applications which wish to make use of the menu services of the present invention first register with menu services 446, step 510. In one embodiment, this registration comprises adding an identifier of the application, as well as any initial preferences, to a registration file during setup and installation of the application at the end point. In one implementation, the identifier of the application is an executable file which can initiate the application and a location within the computer system's storage device(s) where the application can be found. In one implementation, the registration filed is a conventional Windows™ ".ini" configuration file.

In one embodiment of the present invention, the shared commands which are provided as part of the menu are hard-coded into the software which provides menu services 446. These commands are referred to as "shared commands" because each of the conferencing applications can use them. These commands can include, for example, beginning a conference, hanging up from a conference, arranging windows which are displayed at the end point, selecting a window arrangement, etc. Therefore, a user can access these shared commands in the same manner from any of the applications which provide a menu in accordance with the present invention.

During execution of the application, the application can send a message to menu services 446 requesting that a menu in accordance with the present invention be added, step 520. In one embodiment, the requesting application includes an identifier of itself (e.g., the name of the application), an identifier or "handle" to the menu bar of the application, and a location in the menu bar of the application where the new menu is to be placed.

In response to the request, menu services 446 builds a menu to be associated with the requesting application. In one embodiment, the menu is built using conventional Windows™ menu calls, such as the "AppendMenu" call. Menu services 446 then adds a menu item for each application in the registration file and each shared command, steps 530 and 540. In one embodiment, a menu item for a registered application is a name identifying the application which can be displayed to the user(s) of the conferencing end point. Menu services 446 also maintains an identifier of the application corresponding to the menu item. This identifier is then included in any messages later sent to CTK services 442 regarding that menu item.

Once all registered applications and shared commands have been added to the menu, menu services 446 displays the menu at the location identified by the requesting application, step 550. In one embodiment, the menu provided by menu services 446 is a drop-down menu added to the menu bar of the requesting application. In an alternate embodiment, the menu provided by menu services 446 is accessible to the end user on, for example, the toolbar of the requesting application.

In one embodiment, a different menu is created for each application which requests a menu from the menu services 446. In an alternate embodiment, a single menu is provided which is shared by all applications.

In one embodiment of the present invention, additional status information can be provided by menu services 446. For example, when a menu item is highlighted, menu services 446 may provide an indication of whether the application is currently executing on the end point. This status information could be stored and maintained by any of several different services at the end point, such as CTK services 442. The status information is then provided to an application in response to a function call by that application to CTK services 442.

Figure 6:
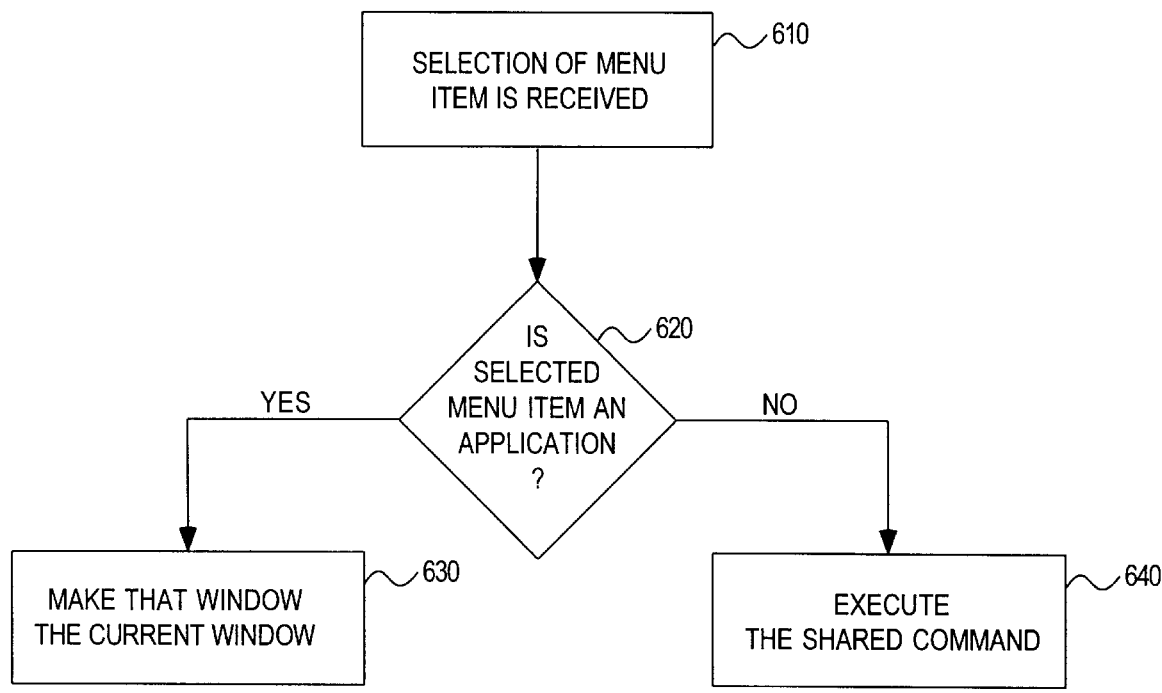
FIG. 6 shows the steps followed in window selection and command execution according to one embodiment of the present invention.

FIG. 6 shows the steps followed in window selection and command execution according to one embodiment of the present invention. The selection of a menu item is first received, step 610. This selection is made by an end user by selecting a menu item of the menu provided by menu services 446. The present invention then determines whether the selected menu item corresponds to an application. In one embodiment, menu services 446 maintains internal identifiers indicating which menu items correspond to applications and which menu items correspond to shared commands.

If the selected menu item corresponds to an application, then that application is made the current window, step 630. Note that this may result in simply the changing of the active window or may include launching the application. In one embodiment, the selected application is made the current window using the Windows™ "ShellExecute" command. In this embodiment, menu services 446 sends a message to CTK services 442 to execute the application corresponding to the menu item. CTK services 442 then retrieves the necessary information from the registration file to launch the application. CTK services 442 then sends the ShellExecute command to the Windows™ operating system. Upon receipt of the ShellExecute command, the Windows™ operating system either launches the application or, if the application is already executing, make it the current window.

However, if the selected menu item corresponds to a shared command, then the command is executed, step 640. In one embodiment, the shared command is executed by sending an identifier of the command to CTK services 442, which in turn takes the necessary steps to execute the command. The necessary steps are dependent on the particular command. For example, a command which is to be executed by CTK services 442 is executed by CTK services 442. Similarly, if a command is to be executed by application services 440, then CTK services 442 sends a message to application services 440 identifying the command to be executed.

In one embodiment of the present invention, information describing a particular menu item is provided by an application when the menu item is selected. The information provided is identified by the menu item when it is installed at the end point. For example, a particular application may include information describing itself in the registration file at the time of installation. Thus, when a menu selection is made, that registration file can be accessed to retrieve and display the descriptive information. In an alternate embodiment, this descriptive information can be provided when a menu item is highlighted rather than (or in addition to) when selected.

In one embodiment, the services of the present invention are provided through a series of function calls. A summary of these function calls follows.

| | |
|---|---|
| AddMenuTool | Used by BuildMenu to add menu items (also referred to as "tools") to the menu being built by obtaining a menu name for an application. The menu name is defined when the application is installed. This function is called once for each installed application and returns a value of false when no more menu items can be added to the menu. |
| BuildMenu | Build a menu for the calling application (the calling application provides an identifier of itself). A menu is created and menu items added by calling AddMenuTool. In one embodiment, a menu entry for the calling application is not included in the created menu. This function returns a menu identifier of "handle" for the created menu. |
| HandleMenu | This function processes a selected menu item. The application which receives the selection calls menu services with an identifier of the menu item. A command parameter identifies the window of the calling application that owns the menu. A message identifying the selection is forwarded to CTK services in order to launch the application, if necessary. |
| InsertMenu | Insert the menu into the menu bar indicated by the calling application in the position identified by the calling application. In one embodiment, this position is in front of a menu item in the menu bar identified by the calling application. The menu is created by calling BuildMenu and inserted using a bit map obtained by calling LoadMenuBitmap. |
| LaunchPreferences | Launches a preferences dialog box for the calling application. An application includes an identifier |

| | -continued |
|---|---|
| | of itself when making this call to menu services. Menu services forwards the call to CTK services, which causes a preferences dialog box corresponding to the calling application to be displayed via a preferences dynamic link library (DLL). |
| LoadButtonBitmap | Loads a menu bit map for use on a button. In one embodiment, all menus created by menu services which are to be displayed as buttons use the same button bit map. |
| LoadMenuBitmap | Loads a menu bit map for use on a menu bar. In one implementation, the bit map is modified to match the color and size of the menu bar. In one embodiment of the present invention, all menus created by menu services which are to be displayed from a menu bar use the same menu bit map. |
| LoadMenuDescription | Loads and returns a descriptive string for the identified menu item. This can be used, for example, to provide information describing the menu item in a status bar when the menu item is selected. |
| LoadMenuHelp | Loads a help file corresponding to the identified menu item. |
| PopupMenu | Provides a floating menu at the screen location (x,y coordinates) specified by the command parameters. |
| UpdateMenu | Updates the indicated menu according to the current application state. The application which desires to update its menu sends this call to menu services. The application may optionally pass an identifier of a menu item in order to update a single menu item. |
| ValidateTool | Validate a menu item by checking for the installed application. |
| FindMenuItem | Searches through the menu items of a menu to find the one with the requested identifier. |
| GetMenuID | Obtains a unique identifier for the passed application. If this is the first time the application has been added to a menu, a menu identifier is created and added to the menu. On subsequent usage of the application, the stored menu identifier is retrieved. |
| GetTotalMenuItems | Determines the total number of menu items stored in the indicated menu. |

In one embodiment of the present invention, the menu provided by menu services 446 can be used to list all of the applications being shared on a conferencing end point. Application services 440 maintains a list of applications which are being shared at an end point, thus menu services 446 can readily determine which applications to include in the menu. This list of applications being shared can replace the list of applications obtained from the registration file, or alternatively, can be separately identified in the menu (e.g., a different location in the menu or displayed in a different font). Any one of the list of shared applications can then be made the active window by selecting it from the menu, as described above. Thus, in this embodiment, a list of applications being shared at an end point of a conference can be made quickly available to the conference participant at that end point.

Additionally, in one embodiment, when an active window is selected for an application being shared on a conference end point, the corresponding window on other conference end points is also made the current active window. In this embodiment, CTK services 442 sends a message to application services 440 upon receipt of the selected menu item. Application services 440 sends a message to all other conferencing end points sharing the application, via MCS 444, to make the identified application the current active window. In one implementation, whether all other conference end points are to have the window made active or only the end point where the selection is made can be provided as an option which can be selected by the users (e.g., through a preferences dialog box).

In one embodiment, the present invention is implemented as a series of software routines executed on one or more processors of a computer system (such as processors 302–303 of FIG. 3). Initially, these software routines may be stored in a storage device (such as mass storage device 325 of FIG. 3). When the conference manager is invoked, the instructions are copied from the storage device into memory (such as RAM 321) and then accessed and executed by processor 302 and/or processor 303. In one implementation these software routines are written in the C++ programming language. However, it is to be appreciated that these routines may be implemented in any of a wide variety of programming languages. Alternatively, the present invention can be implemented in discrete hardware or firmware.

In several of the descriptions above, the present invention is described as simplifying active window selection, application activation, and shared command execution on an end point in a conferencing environment. It is to be appreciated that the use of the present invention in a conferencing environment is only one example of the use of the present invention. It is to be appreciated that the present invention can be used to simplify active window selection on a display in any of a wide variety of environments, including non-conferencing environments.

Thus, once an application includes a menu in accordance with the present invention, a wide variety of commands and applications can be made available to the user. These commands and applications are available to the applications via one centralized location (e.g., menu services), thereby alleviating applications from the burden of each maintaining its own individualized information regarding other applications and shared commands.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for simplifying active window selection, application activation, and shared command execution in a multi-application environment has been described.

What is claimed is:

1. A method of simplifying active window selection and shared command execution in a computer system, wherein a plurality of applications can be executed concurrently in the computer system, the method comprising the steps of:

(a) generating a menu associated with a first application of the plurality of applications which is executing in a currently active window of a plurality of windows being displayed, wherein the menu identifies a subset of the plurality of applications whose corresponding windows can be made currently active, and wherein each application of the subset of applications is installed but at least one is currently not executing in the computer system;

(b) displaying an identifier of the menu in the currently active window to allow user selection of the menu:

(c) receiving a selection identifying one of the subset of applications of the menu; and (d) making a window corresponding to the identified one of the subset of applications a currently active window.

2. The method of claim 1, wherein the computer system is part of a conference environment and wherein each application of the subset of applications can be shared with other conference participants in the conferencing environment.

3. The method of claim 1, wherein each application of the subset of applications registers itself when the applications is installed at the computer system as one of the subset of applications whose corresponding windows can be made currently active.

4. The method of claim 1, wherein the menu identifies a set of commands shared by all applications of the subset of applications which can be executed in the computer system.

5. The method of claim 4, further comprising the step of executing a selected one of the set of shared commands.

6. A method of selecting a currently active window at an end point of a conferencing environment, wherein a plurality of applications can be executed concurrently at the end point, the method comprising the steps of:

(a) identifying a subset of the plurality of applications whose corresponding windows can be made currently active, wherein fewer than all of the subset of applications are currently executing on the end point;

(b) generating a menu associated with a first application of the plurality of applications which is executing in the currently active window of a plurality of windows being displayed, wherein the menu identifies the subset of applications;

(c) displaying an identifier of the menu in the currently active window to allow user selection of the menu;

(d) receiving a selection identifying one of the subset of applications of the menu; and (e) making a window corresponding to the identified one of the subset of applications the currently active window.

7. The method of claim 6, wherein the making step (e) comprises the step of executing a second application of the subset of applications responsive to the second application being selected from the menu.

8. The method of claim 6, wherein each application of the subset of applications can be shared with other conference participants in the conferencing environment.

9. The method of claim 6, further comprising the step of providing status information for each of the subset of applications.

10. The method of claim 9, wherein the status information indicates whether the corresponding application is currently executing.

11. An apparatus for simplifying active window selection and shared command execution in a computer system, wherein a plurality of applications can be executed concurrently in the computer system, the apparatus comprising:

a generating logic operative to generate a menu associated with a first application of the plurality of applications which is executing in a currently active window of a plurality of windows being displayed, wherein the menu identifies a subset of the plurality of applications whose corresponding windows can be made currently active, and wherein each application of the subset of applications is installed but fewer than all of the subset of applications are currently executing;

a display logic operative to display an identifier of the menu in the currently active window to allow user selection of the menu;

a receiving logic operative to receive a selection identifying one of the subset of applications of the menu; and a control logic operative to make a window corresponding to the identified one of the subset of applications a currently active window.

12. The apparatus of claim 11, wherein each application of the subset of applications can be shared with other conference participants in a conferencing environment.

13. The apparatus of claim 12, wherein each application of the subset of applications registers itself when the application is installed at an end point in the conferencing environment as one of the subset of applications whose corresponding windows can be made currently active.

14. The apparatus of claim 11, wherein the menu identifies a set of commands shared by all applications of the subset of applications which can be executed by the computer system.

15. The apparatus of claim 14, further comprising an executing logic for executing a selected one of the set of shared commands.

16. A computer-readable medium having stored thereon a plurality of instructions, designed to be executed by a processor, for implementing a function to:

generate a menu associated with a first application of a plurality of applications in a computer system, the first application executing in a currently active window of a plurality of windows being displayed, wherein the menu identifies a subset of the plurality of applications whose corresponding window can be made currently active, and wherein each application of the subset of applications is installed but fewer than all of the subset of applications are currently executing;

display an identifier of the menu in the currently active window to allow user selection of the menu;

receive a selection identifying one of the subset of applications of the menu; and make a window corresponding to the identified one of the subset of applications a currently active window.

17. The computer-readable medium of claim 16, wherein the computer system is part of a conference environment and wherein each application of the subset of applications can be shared with other conference participants in the conference environment.

18. The computer-readable medium of claim 16, wherein each application of the subset of applications registers itself when the application is installed at the computer system as one of the subset of applications whose corresponding windows can be made currently active.

19. The computer-readable medium of claim 16, wherein the menu identifies a set of commands shared by all applications of the subset of applications which can be executed in the computer system.

20. The computer-readable medium of claim 19, the plurality of instructions further implementing a function to execute a selected one of the set of shared commands.

* * * * *